G. J. FALLKIN.
FRUIT PICKER OR GATHERER.
APPLICATION FILED APR. 9, 1914.
1,105,189.
Patented July 28, 1914.
2 SHEETS—SHEET 1.
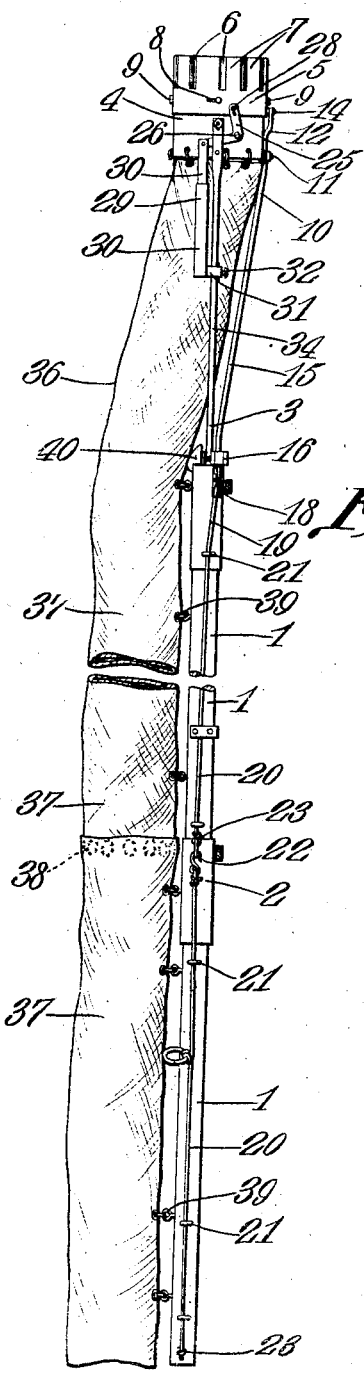
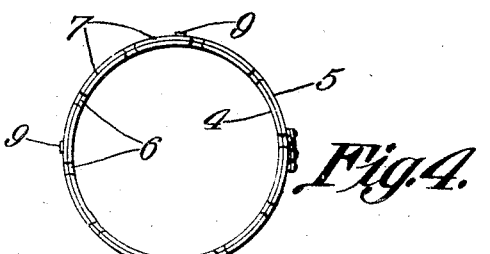
George J. Fallkin, Inventor
by C. A. Snow & Co.
Attorneys G. J. FALLKIN.
FRUIT PICKER OR GATHERER.
APPLICATION FILED APR. 9, 1914.
1,105,189.
Patented July 28, 1914.
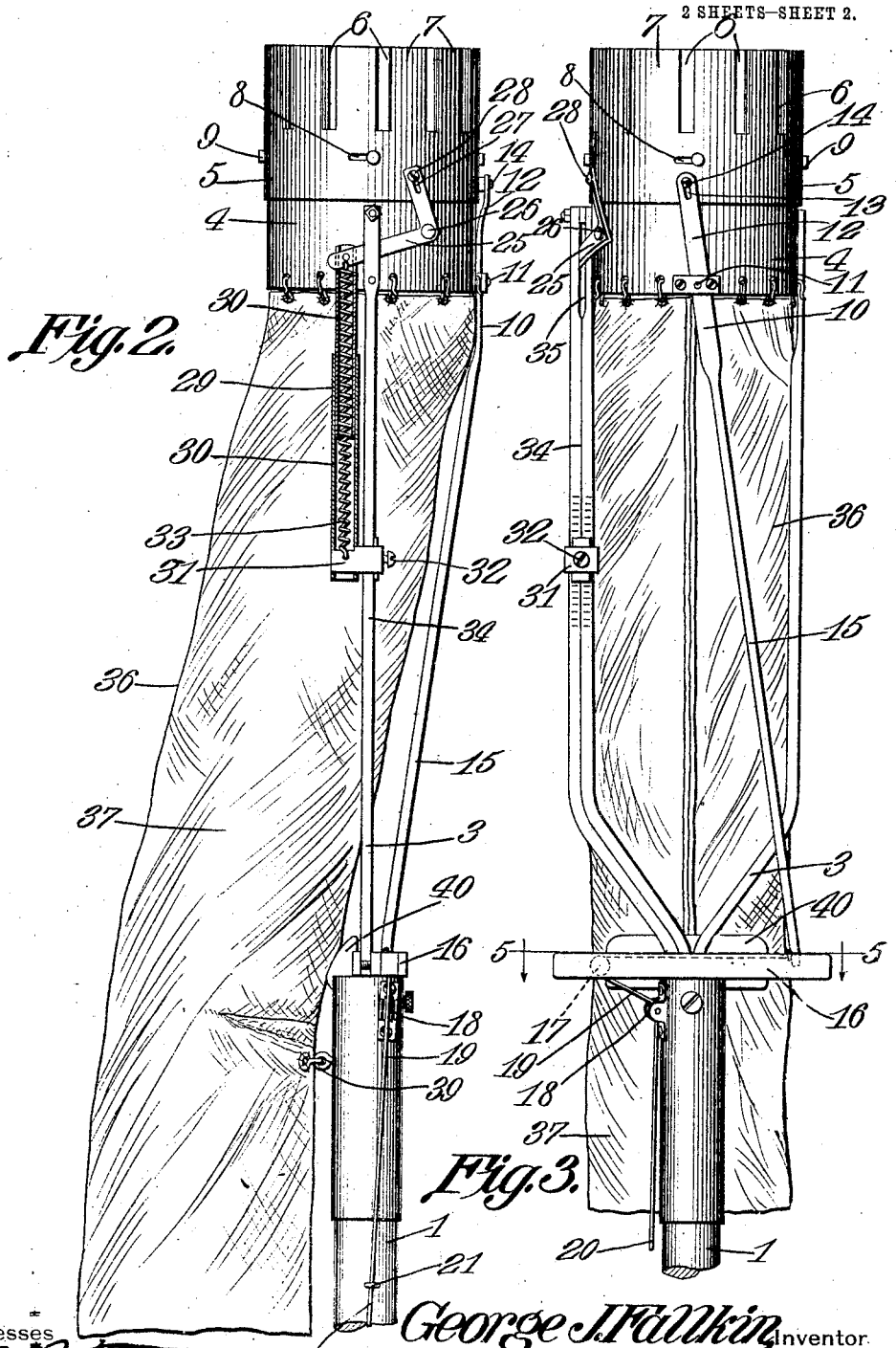

UNITED STATES PATENT OFFICE.

GEORGE J. FALLKIN, OF SAN JOSE, ILLINOIS.

FRUIT PICKER OR GATHERER.

1,105,189.

Specification of Letters Patent.

Patented July 28, 1914.

Application filed April 9, 1914. Serial No. 830,720.

*To all whom it may concern:*

Be it known that I, GEORGE J. FALLKIN, a citizen of the United States, residing at San Jose, in the county of Mason and State of Illinois, have invented a new and useful Fruit Picker or Gatherer, of which the following is a specification.

The present invention appertains to a fruit picker or harvester, and is particularly an improvement over the fruit pickers or gatherers disclosed in my Patent No. 1,085,728, issued February 3, 1914, and in my co-pending application Serial No. 796,296, filed October 20, 1913.

The present invention contemplates the provision of a novel and improved plucking or harvesting head, and novel means for actuating the same.

As a further object, the present invention aims to provide a sectional pole or staff for manipulating the gathering or harvesting head, a sectional tube or chute carried by the sectional pole and a sectional actuating cord for the head, the sections of the pole, chute and actuating cord being assembled, whereby the sections may be readily attached and detached, as desired.

It is also within the scope of the present invention to improve generally, the construction of the picker or harvester, whereby its utility will be enhanced.

With the foregoing and other objects in view which will appear as the description proceeds, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:—

Figure 1 is a side elevation of the improved fruit picker or gatherer, portions being broken away. Fig. 2 is an enlarged side elevation of the plucking or harvesting head. Fig. 3 is another side elevation of the head, taken at right angles to the line of view in Fig. 2. Fig. 4 is a plan or upper end view of the plucking or harvesting head. Fig. 5 is a sectional detail taken on the section line 5—5 of Fig. 3. Fig. 6 is a sectional view of one of the slip joints for the pole sections. Fig. 7 is a side elevation of the slip joint. Fig. 8 is an enlarged sectional detail illustrating one of the clasps for detachably connecting the ends of the chute sections.

In carrying out the present invention there is provided a pole or staff comprising a plurality of sections 1, having their adjacent or meeting ends connected by slip joints 2, whereby the pole sections may be readily assembled and separated.

In order to support the fruit picking head or device from the upper end of the pole, the upper end of the upper pole section 1 has attached thereto a fork 3. A plucking head or device embodies a sleeve or cylindrical shell 4 coaxial with the pole 1 and having its lower or inner end portion riveted or otherwise secured between the free ends of the arms of the fork 3.

Mounted for limited oscillatory movements upon the upper or free end portion of the sleeve or shell 4, is a ring or annulus 5, the upper end of which is preferably flush with the upper or outer end of the shell 4. The upper ends of the shell 4 and the annulus 5 are provided with coöperating or complementing open ended slots 6, forming an annular series of tongues 7, the edges of which may be sharpened in any suitable manner, and the free ends of which are blunt, so as not to injure the fruit.

To mount the annulus 5 for limited oscillatory movements upon the shell 4, the annulus 5 is provided with a plurality of arcuate slots 8, adjacent its lower end, and rivets or stops 9 are passed through the slots 8 to engage the shell 4, for supporting the annulus 5 upon the shell, but enabling the annulus to oscillate to a limited extent for bringing the slots 6 of the annulus and shell into and out of registration.

As a means for actuating the annulus 5 which provides an annular cutter coöperating with the upper portion of the sleeve or shell 4, which also provides an annular cutter, a lever 10 is fulcrumed adjacent one end by means of a rivet or other pivot member 11, to the lower or inner end portion of the shell 4, at one side, or intermediate the free ends of the arms of the fork 3. The upper or short arm 12 of the lever 10 is provided with a longitudinal slot 13 at its free end, through which is engaged a rivet or other member 14 secured to the lower end portion of the annulus or cutter 5, and whereby the oscillation of the lever 10 will impart an oscillatory movement of the annulus 5.

The lower or long arm 15 of the lever 10 has its lower or free end deflected inwardly, as seen in Fig. 1, and slidably engaging within a slotted guide 16 secured transversely upon the upper end of the upper pole section 1. The guide 16 is secured intermediate its ends to the end of the upper pole section 1, and the free end of the lower arm 15 of the lever 10 is freely movable between the ends of the guide 16, for enabling the annulus or cutter 5 to be oscillated properly.

A pulley 17 is pivoted within one end portion of the guide 16, the free end of the arm 15 of the actuating lever 10 being normally disposed at the other end of the guide 16, to hold the slots 6 of the shell 4 and annulus 5 in register. A pulley 18 is carried by the upper end portion of the upper pole section 1 adjacent the guide 16 and at that side adjacent the pulley 17, and an actuating cord or cable 19 is attached at one end to the lower or free end of the actuating lever 15 and is trained over the pulleys 17 and 18 so as to extend along the pole.

The actuating cord or flexible element 19 is divided into sections 20, one for each pole section 1, and eyes or other guiding elements 21 are secured to the pole sections 1, for the passage of the respective cord sections 20. The adjacent ends of the cord sections 20 are detachably connected by means of interengaging hooks and eyes 22 and 23, respectively, attached to the ends of the cord sections 20, adjacent the slip joints of the pole sections.

In order to normally hold the annulus 5 in normal or initial position, with the slots 6 thereof registering with the slots 6 of the shell 4, the bell crank or L-shaped lever 25 has its elbow fulcrumed, by means of a rivet or other pivot member 26, to the shell 4 below the annulus 5. One arm of the lever 25 is provided with a longitudinal slot 27 through which is passed a rivet or other member 28 which engages the shell 4, while an extensible tubular member 29 is pivoted to the free end of the other arm of the lever 25. The extensible member 29 comprises telescoping sections or tubes 30, the upper end of which is connected to the lever 25, as stated, and a slide 31 movable upon one arm of the fork 3. The slide 31 carries a set screw 32 for clamping it at any adjusted position. A coil wire contractile spring 33 is housed within the extensible member 29 and has its ends secured to the lower arm of the lever 25 and the slide 31, to normally swing the lever 25 in such a direction, when the actuating lever 10 is free, to move the annulus 5 to initial or normal position.

The arm 34 of the fork 3 upon which the slide 31 is mounted, is preferably composed of two parts or sections which are provided with a slot 35 between their free end portions through which the lower arm of the depending lever 25 is guided.

The fruit conducting chute or tube 36 which is preferably of textile or fabric material, comprises a number of sections 37, corresponding in number with the pole sections 1, and having glove fasteners or clasps 38 at their meeting or adjacent ends for detachably connecting the chute sections adjacent the slip joints 2 of the pole sections. Each of the chute sections 37 is loosely connected to the corresponding pole section 1, by suitable attaching means 39, so as to support the chute sections to the pole sections. The upper end of the upper chute section 37 is connected in any suitable manner to the lower or inner end of the shell 4 between the arms of the fork 3, the chute 36 passing outwardly from between the arms of the fork 3 in a direction away from the actuating lever 10.

A rubber or other yieldable cushion or pad 40 is secured upon the upper end of the upper pole section 1, at that side of the fork 3 opposite the guide 16, and which is so arranged, as to prevent the fruit, which passes through the chute 36, from injuriously contacting with the upper end of the pole, as would be liable to bruise the fruit. Should the fruit strike the pad or cushion 40, there will be no liability for the fruit to become bruised, the pad or cushion 40 readily deflecting the fruit away from the end of the pole.

In use, any suitable number of the pole sections 1 may be connected together through the medium of the slip joints 2, to build up a pole of desired length, according to the height of picking necessary. Inasmuch as the cord sections 20 and the chute sections 37 are assembled with the pole sections 1, after the pole sections have been assembled, the adjacent ends of the cord sections 20 may be readily attached through the medium of the hooks 22 and eyes 23, and the adjacent or meeting edges of the chute sections 37 may be connected by means of the clasps 38. Thus, the cord and chute, as well as the pole will be practically continuous when assembled and connected. The operator may then readily manipulate the pole to pass the shell 4 over the fruit to be plucked and by turning the pole about its axis, the stem of the fruit may be worked into a pair of the registering slots, in which event the cord 19 may be drawn toward the lower end of the pole, or the operator, which will result in the arm 15 of the lever 10 being swung, to the left, as seen in Fig. 3. The movement of the actuating lever 10 will impart an oscillatory movement to the annulus or cutter 5, which will cause the edges of the slots 6 of the shell 4 and annulus or cutter 5 to shear past each other to accomplish the severing of the fruit stem. The fruit being severed, will drop or gravitate down the chute or conductor 36, and may be caught by the hand, or arrested in any other suitable manner and deposited in a basket or other receptacle. As soon as the actuating cord 19 is released, the annulus or cutter 5 will return to its normal or initial position, under the influence of the returning spring 33 which in swinging the lever 35 will turn the annulus or cutter 5 backward, and thereby also return the actuating lever 10 to its normal position as seen in Fig. 3. The harvesting device is then in condition for repeated use, and may be employed for conveniently and quickly gathering or harvesting the fruit, without the necessity of the operator employing a ladder, or climbing the tree, as would involve considerable labor and time, and as is dangerous to life and limb.

The tension of the spring 33 may be adjusted, by loosening the set or clamping screw 32, and moving the slide 31 along the arm 34 of the fork 3, either upwardly or downwardly, to decrease or increase the tension of the spring, whichever is desired. Due to the provision of the actuating lever 10, as defined, and the actuating cord trained over the pulleys and through the guides carried by the pole, the annulus or cutter 5 may be actuated in a simple and efficient manner, to readily shear or sever the toughest fruit stems.

From the foregoing, taken in connection with the drawings, the advantages and capabilities of the present device will be obvious to those versed in the art, without further comment being necessary.

Having thus described the invention, what is claimed as new is:—

1. In a fruit picker, a pole, a shell carried by the upper end thereof, an annulus mounted for oscillatory movements upon the shell, the shell and annulus having coöperating open ended slots, a transverse guide, an actuating lever having one arm operatively connected to the annulus and having its other arm received by said guide, a pulley carried by one end portion of the guide, an actuating cord connected to the second mentioned arm of the lever and trained over the said pulley, and means for returning the annulus to normal position.

2. In a fruit picker, a pole, a fork attached to the upper end thereof, a shell secured between the arms of the fork, an annulus mounted for limited oscillatory movements upon the shell, the shell and annulus having coöperating open ended slots, a transverse guide secured to the upper end of the pole, an actuating lever fulcrumed to the shell, the actuating lever having an upper arm operatively connected to the annulus and having a lower arm received by the said guide, a pulley carried by one end portion of the guide, and an actuating cord connected to the second mentioned arm of the lever and trained over the said pulley.

3. In a fruit picker, a pole, a fork attached to the upper end thereof, a shell secured between the arms of the fork, an annulus mounted for limited oscillatory movements upon the shell, the shell and annulus having coöperating open ended slots, actuating means carried by the pole and operatively connected to the annulus, a bell crank lever having its elbow fulcrumed to the shell and having one arm operatively connected to the annulus, a slide adjustable upon one arm of the fork, and a retractile spring connecting the slide and the other arm of the said lever.

In testimony that I claim the foregoing as my own, I have hereto affixed my signature in the presence of two witnesses.

GEORGE J. FALLKIN.

Witnesses:
JOHN L. EYNE,
JOHN B. NORRIS.